May 31, 1927.
R. E. EAVES ET AL
1,631,022
GLARE ELIMINATOR
Filed March 1, 1926
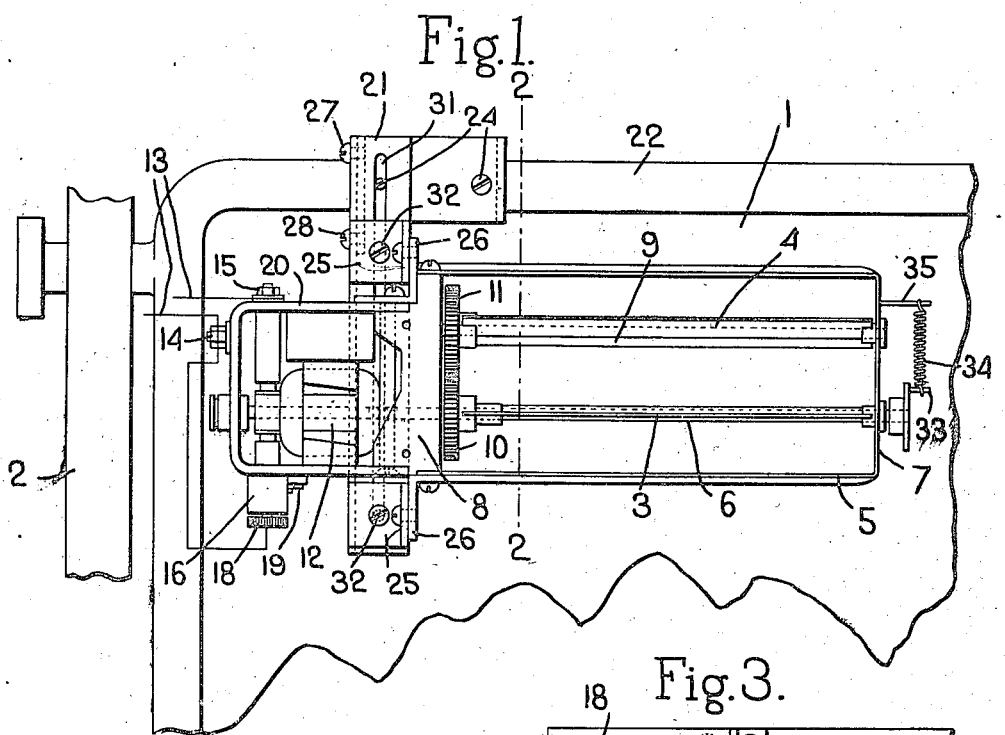
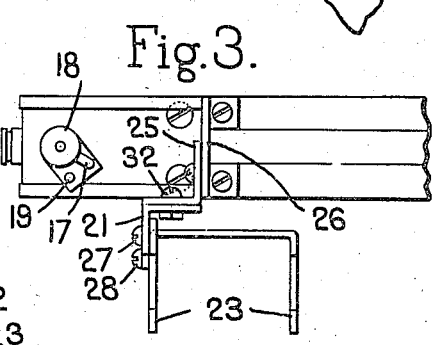
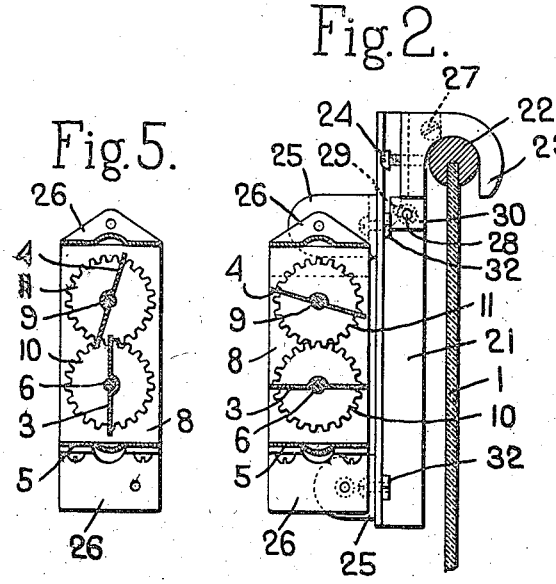
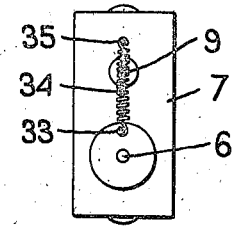
Inventors.
Ralph Eaves
William C. Keen
by Heard Smith & Tennant.
Attys.

Patented May 31, 1927.

1,631,022

UNITED STATES PATENT OFFICE.

RALPH E. EAVES AND WILLIAM C. KEEN, OF ALLSTON, MASSACHUSETTS.

GLARE ELIMINATOR.

Application filed March 1, 1926. Serial No. 91,437.

This invention relates to glare screens which are designed for use in connection with automobiles for the purpose of shielding the driver's eyes from the glare of the headlights of an approaching automobile.

The invention relates to that class of glare screens which comprise an intermittent light interrupter which is situated in the line of vision of the driver of the automobile and which by its operations intermittently cuts off the light from the lamp of the approaching car thus reducing the amount of light which reaches the driver's eyes without interfering appreciably with his vision.

One of the objects of the invention is to provide a novel glare screen of the above type which when in operation will perform its functions of reducing the amount of light from the headlights of an approaching car which reaches the driver and which when not in use will give driver a substantially free and unobstructed vision of the road ahead. To this end the device embodying the invention comprises one or more blades, each of which is arranged to rotate about an axis extending substantially at right angles to the line of vision of the driver together with means for rotating the blade or blades rapidly, the construction being such that when the rotating means is inoperative and the blade or blades are at rest each blade will stand with its edge presented to the driver thus leaving the driver a free and unobstructed view.

Other objects of the invention are to provide various improvements in glare screens of this type all as will be more fully hereinafter set forth.

In order to give an understanding of the invention we have illustrated in the drawings a selected embodiment thereof which will now be described after which the novel features will be pointed out in the appended claims.

Fig. 1 illustrates a portion of the windshield of an automobile having the improved glare screen attached thereto;

Fig. 2 is a section on the line 2—2, Fig. 1;

Fig. 3 is an under side view of one end of the device;

Fig. 4 is an end view;

Fig. 5 is a view similar to Fig. 2 but showing the blades in position to cut off the driver's vision of the road ahead.

In the drawings 1 indicates the portion of the windshield of an automobile through which the driver looks when operating the car, 2 being a portion of the windshield post. As stated above our improved glare screen comprises one or more light-interrupting blades, each of which is mounted to rotate about an axis at right angles to the line of vision of the driver. Any number of blades may be employed in any glare screen without departing from the invention. The illustrated embodiment of the invention contains two blades, indicated at 3 and 4 respectively. These blades are supported in a frame 5 which is so supported that the blades 3 and 4 are in the line of vision of the driver. Each of the blades is herein shown as a long and relatively narrow strip of metal. The blade 3 is mounted upon a shaft 6 which extends longitudinally thereof and preferably along the median line thereof, one end of the shaft being journalled in the end 7 of the frame and the other end of the shaft being journalled in a bearing block 8 carried by the frame. The blade 4 is similarly mounted on a shaft 9 which extends longitudinally of the frame, one end being journalled in the end of the frame and the other end being journalled in the bearing block 8.

Means are provided for rotating the shafts rapidly and as they are rotated each blade will be turned from a position in which it occupies a vertical plane at right angles to the line of vision and thus presents its side face to the driver, to a position in a horizontal plane in which it is parallel to the line of vision so that the driver sees it in edge view, and vice versa. When the blade or blades are rotating, therefore, each blade will act to intermittently cut off the light from the head lamps of an approaching car but as the blades are rotating rapidly they will merely cut down the light which reaches the driver's eyes without materially interfering with his vision of the road directly ahead.

Where more than one blade is used the blades will preferably be rotated in unison and in timed relation with each other. In the case of a device employing two blades 3 and 4 these blades may be connected by intermeshing gears 10 and 11 of the same size which are fast on the shafts 6 and 9 so that the two blades rotate at the same speed.

While any appropriate means for rotating the blades may be employed we have shown herein an electric motor indicated generally at 12 and the armature of which is fast on the shaft 3. This motor is supplied with current from any suitable source, such for instance the automobile battery, not shown, the circuit wires 13 being illustrated as connected to the two terminals 14 and 15.

16 indicates a switch in the circuit by which the operation of the motor is controlled. The switch may be of any approved type and is herein shown as comprising a switch arm 17 operated by a thumb piece 18 and adapted to be closed onto a contact 19 in the motor circuit. The motor is shown as mounted in an extension 20 of the frame 5 and the switch may be conveniently placed beneath said extension where it is within easy reach of the driver.

The blades 3 and 4 will preferably have such a size and are so positioned relative to each other that as they rotate they come into a vertical plane substantially simultaneously and then each moves into a horizontal plane at the same time. Furthermore, the width of the blades is such that when they are in the vertical plane, as shown in Fig. 5, they obstruct entirely the driver's vision through the frame while when they are in their horizontal position, as shown in Fig 2, they present practically no obstruction to the line of vision and at this time the driver has practically unimpaired vision of the roadway ahead Since in the operation of the device the driver has alternately and in rapid succession unimpaired vision of the road ahead and then complete obscurity of vision the result will be in effect that the device cuts down or reduces the light reaching the driver's eye from an approaching automobile by more than one-half which is sufficient to eliminate entirely the disagreeable effect of the glaring rays of the headlight of such an approaching automobile The device may be supported in position in any approved way without departing from the invention. In the construction herein shown the frame 5 is secured to a bracket 21 which is clamped to the top rail 22 of the windshield, this being a construction which might be employed in an open automobile. The upper end of the bracket is shown as having a hook portion 23 which hooks over the upper rail 22 of the windshield, said bracket being held in position on the rail by clamping screws 24. The bracket is shown as an angle iron bracket and it has two ears 25 extending therefrom which are clamped to other ears 26 extending from the frame. The bracket is made so that it can be adjusted into different angular positions and for this purpose the angle iron member 21 is pivoted to the hook member 23, as shown at 27, so that the angle iron member and frame can be swung toward and from the windshield. The motor is held in adjusted position by a clamping screw 28 which extends through a slot 29 in one leg of the angle iron member and screws into a foot portion 30 depending from the hook member.

The supporting ears 25 are vertically adjustable on the bracket 21 so as to provide for adjusting the position of the glare screen in a vertical direction. For this purpose one leg of the angle iron member 21 is provided with a slot 31 which extends longitudinally thereof, and which receives clamping screws 32 by which the ears are clamped to the bracket.

In order that said glare screen or glare eliminator may not present any material obstruction to the driver's vision when it is not operating and when it is still situated in front of the driver we have provided herein means whereby when it is idle or at rest the blades will be maintained in a horizontal position, as shown in Fig. 2, in which position they will present the least possible obstruction to the driver's vision. This is accomplished herein by providing one of the shafts at its end (the shaft 3 in this instance) with a pin or projection 33 which is situated eccentrically to the shaft and to which is connected one end of a pulling spring 34, the other end of the spring being fastened to a fixed point, as for instance the projection 35 extending from the frame. The tendency of the spring will be to pull the crank pin 33 to its highest point. This crank pin is situated at 90° from the blade so that when the crank pin is brought into its highest point at its upper dead center, as shown in Figs. 1 and 4, the blade 3 will be in a horizontal position. Therefore, whenever the switch is opened to stop the motor 12 the blades will come to rest in the position shown in Fig. 2, in which position they present the minimum obstruction to the driver's vision.

While it would be within the invention to mount the frame so that it could be swung out of the way if desired yet with this construction, by which the blades when brought to rest are automatically stopped in their horizontal position, it is not necessary to swing the frame out of the way when the glare screen is not desired as the blades in their horizontal position present practically no obstruction to the driver's vision.

While we have shown herein one way by which the glare screen may be attached to an automobile yet we wish it understood that this is shown merely for illustrative purposes and that the attaching means may be varied to suit different types of cars without in any way departing from the invention.

One advantage resulting from the use of this device is that it does not effect the color of any object seen through the device, as a colored screen would do, nor does it effect in any way the driver's perception of distance. Any object seen through the device when the blades are operating will appear the same as when not seen through the device except that the light will be reduced but the color of the object does not appear to be changed nor does the distance of the object of the driver appear any different when seen through said device than when seen without the glare eliminator interposed in the line of vision.

The device herein shown has the further advantage that it gives a varied reduction of light at different points in the line of vision. Along the line of the axis of rotation of each blade the reduction in light will be greatest and in the space between the two axial lines of rotation the reduction in light will decrease progressively from said lines toward the center of said space. The amount which the light is reduced at any point depends upon the proportion of the entire time in which the blade cuts off the view of the driver as compared with the portion of time in which the view is not interfered with. Along a line closely adjacent the axis the vision of the driver will be cut off for a greater portion of the time than along a line adjacent where the outer edge of the blade travels in its rotation, this being the result of a construction in which the blades rotate about an axis perpendicular to the line of vision.

With the two blades, therefore, as shown herein there will be two parallel lines along the axes of rotation where the reduction of light will be greatest and in the space between the two axes the reduction of light decreases progressively from the axis to the center at the points where the blades overlap. Hence when the device is in use the driver can, by shifting his head slightly up or down, look at an object in front of the automobile through the portion of the anti-glare device which gives the greatest reduction of light or through the portion which gives the least reduction.

When a driver is meeting an automobile with very bright headlights he can shift his eyes so that the line of vision between his eyes and the headlights will come closely adjacent to the axis of one of the blades thus giving a maximum reduction of light while if the lights are not very bright and better vision is desired he can shift his eyes up or down so as to look at the object through the center of the space between the axes and where the reduction of light is least.

While we have above referred to our invention as a glare eliminator which protects the eyes of the driver of an automoile from glaring headlights yet the invention may also be useful as a protector in other fields as for instance in protecting a person from foreign bodies in the air. When used in this way if the device is held in front of the eyes or face the rotating blades will protect the face and eyes against any flying particles in the air without impairing his vision.

We claim:

1. A glare screen for automobiles comprising a blade rotatable about an axis extending at substantially right angles to the line of vision of the driver of the automobile, and means to rotate said blade continuously and rapidly, whereby the amount of light which passes through the rotating blade to the driver's eye increases progressively from the axial line of rotation outwardly.

2. A glare screen or protector comprising a plurality of blades each rotatable about an axis extending substantially at right angles to the line of vision of the user, and means to rotate said blades continuously and rapidly.

3. A glare screen or protector comprising a plurality of blades rotatable about parallel axes extending at substantially right angles to the line of vision of the user, and means to rotate said blades continuously and rapidly.

4. A glare screen for automobiles comprising a plurality of rotatable blades having parallel axes, means for supporting said blades with their axes at substantially right angles to the line of vision of the driver of the automobile, and means for rotating said blades continuously and rapidly, whereby the rotating blades produce a varied reduction of the light passing to the driver's eye, the greatest reduction being along the axis of rotation.

5. A glare screen for automobiles comprising a plurality of blades rotatable about parallel axes, means for supporting said blades so that their axes are substantially at right angles to the line of vision of the driver of the automobile, and means to rotate said blades continuously in unison, the axes of the blades being so spaced that when the blades are in a plane at right angles to the line of vision they completely obscure said vision.

6. A glare screen for automobiles comprising a plurality of blades rotatable about parallel axes extending at substantially right angles to the line of vision of the driver of the automobile, means operative when the blade-rotating means ceases to operate to bring the blades to rest in planes substantially parallel to the line of vision, whereby when at rest they do not appreciably impair the vision of the driver.

In testimony whereof, we have signed our names to this specification.

RALPH E. EAVES.
WILLIAM C. KEEN.